United States Patent
Thalhammer et al.

(10) Patent No.: US 8,864,928 B2
(45) Date of Patent: Oct. 21, 2014

(54) VEHICLE COMPONENT FABRICATED WITH A HOT MELT ADHESIVE, AND A METHOD AND DEVICE FOR THE MANUFACTURE THEREOF

(71) Applicant: Lisa Draeximaier GmbH, Vilsbiburg (DE)

(72) Inventors: Ernst Thalhammer, Bodenkirchen/Aich (DE); Robert Magunia, Geisenhausen (DE)

(73) Assignee: Lisa Dräxlmaier GmbH, Vilsbiburg (DE)

(*) Notice: Subject to any disclaimer, the term of this patent is extended or adjusted under 35 U.S.C. 154(b) by 114 days.

(21) Appl. No.: 13/659,045

(22) Filed: Oct. 24, 2012

(65) Prior Publication Data

US 2013/0108844 A1 May 2, 2013

(30) Foreign Application Priority Data

Oct. 28, 2011 (DE) .................. 10 2011 085 412

(51) Int. Cl.
*B29C 65/42* (2006.01)
*B32B 37/12* (2006.01)
*B32B 7/12* (2006.01)
*C09J 5/06* (2006.01)

(52) U.S. Cl.
CPC ............ *B29C 65/42* (2013.01); *B32B 37/1284* (2013.01); *B32B 7/12* (2013.01); *B32B 37/12* (2013.01); *C09J 5/06* (2013.01); *B32B 2605/003* (2013.01)
USPC .......................... 156/242; 156/245

(58) Field of Classification Search
USPC ........................................ 156/242
See application file for complete search history.

(56) References Cited

U.S. PATENT DOCUMENTS

| | | | |
|---|---|---|---|
| 2009/0053463 A1 | 2/2009 | Terfloth et al. | |
| 2012/0237712 A1 | 9/2012 | Thielhorn | |
| 2013/0020022 A1* | 1/2013 | Keite-Telgenbuscher et al. | 156/272.2 |

FOREIGN PATENT DOCUMENTS

| | | |
|---|---|---|
| DE | 198 15 115 A1 | 10/1999 |
| DE | 198 34 199 A1 | 2/2000 |
| DE | 10 2004 016 515 A1 | 10/2005 |
| DE | 10 2005 015 340 A1 | 10/2006 |
| DE | 10 2009 043 498 A1 | 4/2011 |
| DE | 10 2009 055 091 A1 | 6/2011 |
| EP | 1 475 424 A1 | 11/2004 |

* cited by examiner

Primary Examiner — Philip Tucker
Assistant Examiner — Vicki Wu
(74) Attorney, Agent, or Firm — Wolf, Greenfield & Sacks, P.C.

(57) ABSTRACT

A vehicle interior component fabricated using a hot melt adhesive having two base polymers with different melting points, a higher melting point and a lower melting point, for bonding the surfaces of at least two layers of the vehicle interior component. The hot melt adhesive is applied to one of the layers in an activated state at a temperature equal to or greater than the higher melting point and closely bonds with the layer when the adhesive cools to a temperature below the higher melting point. The bond between the two layers is effected at a lower temperature corresponding to the lower melting point to enable removal of the component layers from a mold while still in a warm state.

11 Claims, 1 Drawing Sheet

VEHICLE COMPONENT FABRICATED WITH A HOT MELT ADHESIVE, AND A METHOD AND DEVICE FOR THE MANUFACTURE THEREOF

RELATED APPLICATIONS

Foreign priority benefits are claimed under 35 U.S.C. §119 (a)-(d) or 35 U.S.C. §365(b) to German application number 10 2011 085 412.6, filed Oct. 28, 2011, which is incorporated herein by reference in its entirety.

BACKGROUND

1. Field

Aspects relate to vehicle components, such as vehicle interior components, for example, instrument panels, center consoles, door trims, pillars and headliners, in which at least two layers are bonded using a hot melt adhesive. Aspects relate to vehicle components including a sewn covering, such as a decorative material, that is bonded to a substrate using a hot melt adhesive. Aspects also relate to method(s) for manufacturing a vehicle component and a device for application of the hot melt adhesive to one of the layers to be bonded.

2. Discussion of Related Art

Vehicle components, such as vehicle interior components, can involve the lamination of substrates with sewn decorative layers. A known method for laminating the layers of a component involves applying a dispersion adhesive to a side of each layer that are to be bonded together. The layers are bonded in a laminating mold using heated dies. The layers are removed from the laminating mold after reaching a desired temperature in the adhesive joint that is specific to the material combination and before cooling down completely. The layered composite is held in position during demolding by the adhesive.

Applying adhesive on a side of each layer to be bonded and the two processes associated with this method require a large amount of manufacturing space and energy. The layers also need to be bonded together within a specified time frame after applying the adhesive. In addition, the adhesive is conventionally applied using a spray process. When applying the adhesive to the so-called B-side of the decorative layer, soiling of the so-called A-side (i.e., the visible side of the finished vehicle component) may occur and result in a higher rate of material waste.

Other known methods for laminating the layers of a component involve the use of a hot melt adhesive. Examples of such methods are described in DE 10 2004 016 515 A1, DE 10 2005 015 340 A1 and DE 10 2009 043 498 A1. When using a hot melt adhesive, it is possible to omit the drying process associated with the use of a dispersion adhesive, such that the space requirement for storage can be reduced as compared to the dispersion adhesive method described above. It is also possible to apply a hot melt adhesive only unilaterally, i.e., to a side of only one of the layers to be bonded. This allows the other layer to be kept available without adhesive and without it being necessary to carry out quick processing. Thus, for example, the sewn decorative layers can be kept available while each of the substrates is provided with hot melt adhesive and laminated with a corresponding decorative sewn covering.

When using a hot melt adhesive, the layers are heated in a laminating mold up to the melting point of the hot melt adhesive, e.g. 170° C., to thereby activate the adhesive. A cooling phase then follows until the hot melt adhesive solidifies and the composite of the two layers stays in position. This requires that demolding from the laminating mold take place only after cooling. As a result of the necessary cooling, use of a hot melt adhesive substantially extends the laminating process and consumes considerably more energy as compared to the use of a dispersion adhesive.

Such known processes for manufacturing laminated vehicle components result in relatively long cycle times and high costs.

An aim of the present invention is to combine the respective advantages of the alternative methods described above. Against this background, an object of the present invention is to provide a method for the manufacture of a vehicle component, such as a vehicle interior component, which bonds two layers of the component using a hot melt adhesive while partially or completely dispensing with the cooling process so as to reduce the process cycle times. Another object of the present invention is to create a vehicle component, such as a vehicle interior component, including at least two layers that are permanently bonded using a hot melt adhesive and which can be manufactured faster and therefore less expensively. A further object of the present invention is to provide a device for applying a hot melt adhesive with which the method according to the invention can be implemented and with which the component according to the invention can be manufactured.

SUMMARY

In one illustrative embodiment, a method is provided for manufacturing a vehicle interior component having a plurality of layers. The method comprises applying a hot melt adhesive to a first side of a first layer, the hot melt adhesive including a first base polymer having a first melting point and a second base polymer having a second melting point that is greater than the first melting point. The hot melt adhesive is applied to the first side of the first layer at a temperature greater than or equal to the second melting point. The method further comprises applying a second layer to the first side of the first layer following application of the hot melt adhesive, heating the hot melt adhesive between the first layer and the second layer, in a laminating mold, to a specified temperature greater than or equal to the first melting point and less than the second melting point, and demolding the plurality of layers of the component from the laminating mold prior to complete cooling of the hot melt adhesive.

In another illustrative embodiment, a vehicle interior component comprises at least two layers bonded together with a hot melt adhesive, the hot melt adhesive including a first base polymer having a first melting point and a second base polymer having a second melting point that is greater than the first melting point.

In another illustrative embodiment, a device is provided for applying a hot melt adhesive to a first side of a first layer of a vehicle component, where a second layer of the vehicle component is to be bonded to the first layer with the hot melt adhesive. The hot melt adhesive includes a first base polymer having a first melting point and a second base polymer having a second melting point that is greater than the first melting point. The device comprises a first outlet port to deliver a flow of the hot melt adhesive therefrom, a first heater to heat the hot melt adhesive upstream of the outlet port, a temperature sensor to detect the temperature of the hot melt adhesive at the outlet port, and a controller to regulate the temperature of the hot melt adhesive at the outlet port by controlling the first heater based on the temperature of the hot melt adhesive detected by the temperature sensor at the outlet port so that the hot melt adhesive is applied to the first layer at a temperature greater than or equal to the second melting point.

Various embodiments of the present invention provide certain advantages. Not all embodiments of the invention share the same advantages, and those that do may not share them under all circumstances.

Further advantages and features of the present invention, which may be implemented singly or in combination with one or a plurality of the features referred to above emerge from the following description of preferred embodiments.

BRIEF DESCRIPTION OF DRAWINGS

Various embodiments of the invention will now be described, by way of example, with reference to the accompanying drawings, in which.

DETAILED DESCRIPTION

Figure 1:
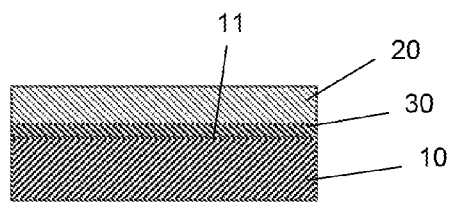
FIG. 1 is a schematic illustration of a two-layer structure of a vehicle component according to an embodiment of the present invention.

Aspects of the invention are based on the concept of using a hot melt adhesive that includes two base polymers having different melting points. Upon applying the adhesive, a firm bond is created between the base polymer with the higher melting point and a first layer, and the base polymer with the lower melting point is used in the laminating mold for bonding with a second layer. In this manner, it is thus possible to reduce the temperature in the laminating mold because only the lower melting point of the base polymer with lower melting point needs to be reached to bond the layers together. Additionally, it is possible to partly or completely dispense with cooling because, for the base polymer with the lower melting point, a certain amount of adhesion (early strength or green strength) of the layered composite is created upon reaching the melting point, such that no peeling of the two layers occurs under the influence of restoring forces when opening the mold and demolding the component.

Aspects of the invention involve a method for the manufacture of a vehicle component, such as a vehicle interior component, having a plurality of layers.

A first layer of the component may be a dimensionally stable substrate which may be manufactured, for example, of plastic by an injection molding process or via a melt strand deposition process or similar techniques. However, it is also contemplated to use other materials which can be manufactured as a single compound or in the form of mats (natural-fiber-reinforced polyurethane, natural-fiber-reinforced polypropylene or natural-fiber-reinforced thermoset materials). In this case, substrates of nonpolar materials may be surface-treated to enable adequate adhesion of the adhesive.

A second layer of the component may be a sewn decorative layer, which may be referred to as a sewn covering. The second layer may be comprised of real leather or synthetic leather, for example, based on polyurethane, polyvinyl chloride, thermoplastic polyurethane, or olefin-based thermoplastic elastomers and similar. It is also contemplated that textiles, carpets and other customary materials may be employed for use in the vehicle interior region. The sewn covering may also be provided on its side facing away from the visible side with a haptic layer, such as a spacer fabric, for example, of polyester, layered foam, non-woven fabric, wadding or similar.

In one embodiment, the layers of the vehicle component may be bonded together with a layer of hot melt adhesive. In this respect, it is contemplated to bond at least two layers, such as a decorative layer to a substrate or a haptic layer to a substrate, or to bond more than two layers, such a decorative layer, a haptic layer and a substrate, together using one or more layers of hot melt adhesive.

The hot melt adhesive may be applied in a first step on one side of a first layer of the two layers to be bonded. If a decorative layer, with or without haptic layer, is to be applied to a substrate, the hot melt adhesive may preferably be applied to the substrate. The hot melt adhesive may advantageously be applied to only one side of a first layer of the two layers while the side to be bonded of the second layer of the two layers is not coated with hot melt adhesive.

In this manner, the storage time of the coated part may be up to several days while the uncoated layer (e.g., decorative layer) can be kept available for use without any problem and without time restriction.

Application of the adhesive to the substrate allows the sewn decorative panels, with or without haptic layer, to be cut and sewn centrally at one location. The decorative panels can also be transported easily and can be stored in any place in the interim. The decorative panels may be accessed according to the order situation without affecting the laminating process. With application of the adhesive to the substrate, it is possible to avoid spraying adhesive onto the "A" side (i.e., the visible side of the decorative layer), such that there is no soiling of the visible side which significantly reduces the rate of material waste. This process also renders it is easier to prevent kinking and creasing when processing the sewn decorative material because it possesses maximum flexibility due to the lack of adhesive application. Moreover, the use of a hot melt adhesive requires no subsequent drying which reduces the space requirement and cycle time for the whole process.

In one embodiment, the hot melt adhesive may include a first base polymer having a first melting point and a second base polymer having a second melting point that is higher than the first melting point. For example, the adhesive may be a humidity-reactive, one- or two-component hot melt adhesive based on polyurethane-prepolymers. The hot melt adhesive, in the area of the base polymer with the lower melting point, has rheological properties which bring about both a wetting of the surface (side) of the layer to be bonded without adhesive application and also still has sufficient cohesive constituents which, in the still warm or hot state of the component, keep the layers together when demolding the component from the laminating mold so as to prevent peeling under the influence of restoring forces.

The hot melt adhesive may be applied to one side of a first layer of the two layers, such as the substrate, at a temperature which is greater than or equal to the second melting point (i.e., the higher melting point). As a result, the second base polymer of the hot melt adhesive is already activated on application and enters into a close bond with the first layer, such as the substrate, after cooling. Subsequently, the second layer of the two layers may be applied to the side of the first layer provided with the hot melt adhesive. In this case, prefixing may take place in order to hold the layers temporarily in position relative to each other.

The temporarily bonded layers may be transferred into a laminating mold. The laminating mold may be a press with heated dies, such as rubber blanket systems, HPF systems, vacuum laminating systems, and the like. In the laminating tool, the first base polymer of the hot melt adhesive between the first and second layer is heated to the desired joining temperature under the input of heat. In one embodiment, the temperature is greater than or equal to the first melting point and is less than the second melting point. The temperature may be selected such that it slightly exceeds the first melting point of the hot melt adhesive in order to activate the first base polymer. At the same time, the first base polymer preferably has the properties not only of a temperature-sensitive (i.e., a hot melt) adhesive, but also the properties of a pressure-sensitive adhesive. As a result, the cohesion between the layers is already sufficient on reaching the first melting point to keep the two layers together and to prevent peeling under the influence of restoring forces such that the component can be demolded prior to complete cooling of the hot melt adhesive, advantageously essentially immediately after the specified joining temperature is reached. "Essentially immediately" is to be understood to mean that the mold is not opened immediately on reaching the joining temperature but rather after reaching the joining temperature, the specified time and the specified pressure in the laminating mold. When these parameters are met, the laminating mold may be opened which may include cooling slightly for a short time. However, energy-intensive, active cooling of the laminating mold is omitted. The component can be allowed to cool completely after demolding. As a result, it is possible to considerably reduce the cycle times during the laminating process and to reduce the energy costs (the long-drawn-out cooling in the process can be omitted). At the same time, however, the advantages of a laminating process can be implemented by using a hot melt adhesive.

In one embodiment of the method, the temperature of the hot melt adhesive may be advantageously regulated on leaving an outlet port of a device for applying the hot melt adhesive to the first layer so as to enable the hot melt adhesive to still have a temperature above the second melting point when it is applied to the side of the first layer. In this case, the temperature of the hot melt adhesive may advantageously be measured on leaving an outlet port and, based on the measured value, be maintained at a desired value or be increased or lowered in value using a heater or heating device. This regulation may also be influenced by other parameters, such as the room temperature or the distance of the outlet port from the side (surface) of the first layer. Thus, for example, with a complex surface topography of the part to be coated (i.e., the first layer to be coated), the distance can be stored in each case as a function of the position between the outlet port and the surface of the first layer, and the temperature of the hot melt adhesive at the outlet port may be regulated based on the distance, the prevailing room temperature and the temperature which is measured at the outlet port.

To further prevent rapid cooling of the hot melt adhesive after leaving the outlet port, it may be desirable to accompany the hot melt adhesive being applied to the first layer with a hot air flow that may be arranged to shroud the adhesive. To prevent turbulence and faster cooling of the hot melt adhesive, the hot air flow may be directed to escape parallel to the hot melt adhesive in the direction of the first layer and surround the hot melt adhesive. The temperature of the hot air flow may also be regulated to keep the hot melt adhesive at a temperature which is still above the second melting point of the second base polymer when it is applied to the first layer. In this case, regulation may be influenced by the same parameters referenced above, including the temperature of the hot melt adhesive at the outlet port, the room temperature and/or the distance between the outlet port and the side of the first layer to be coated. In one embodiment, the hot melt adhesive may be applied to the first side of the layer in the manner of a curtain which can also reduce or prevent rapid cooling, particularly in conjunction with a shrouding hot air flow. The temperature of the hot air flow may have a range of approximately 200° C. to 300° C., a range of approximately 225° C. to 275° C., or a range of approximately 240° C. to 260° C. The temperature of the hot melt adhesive at the outlet port may have a range of approximately 130° C. to 170° C., and more preferably a range of approximately 145° C. to 155° C. The distance between the outlet port and the surface of the first side of the first layer may have a range of approximately 3 cm to 15 cm, wherein either the device for applying the hot melt adhesive (i.e., the outlet port or outlet ports) and/or the component may be movable.

In one embodiment, the first melting point of the first base polymer may have a range of approximately 35° C. to 55° C., a range of approximately 40° C. to 50° C., and purely by way of example a melting point of 45° C. The melting point is the temperature at atmospheric pressure. Thus, the melting point may be significantly below the melting point of conventional base polymers which are used in hot melt adhesives. In this case, it is preferable to use a first base polymer which corresponds to that of a pressure- and heat-sensitive adhesive. In this manner, the hot melt adhesive will form sufficiently cohesive constituents under the effect of pressure to hold the layers together even in a still warm state. Additional cohesive constituents are formed during cooling so as to implement a firm and permanent bond in a completely cooled state, wherein the bond particularly satisfies the exacting requirements in automotive manufacture.

In one embodiment, the second melting point of the second base polymer has a range of approximately 60° C. to 100° C., preferably a range of approximately 65° C. to 85° C., and corresponds to the melting point of conventional hot melt adhesives or the base polymers contained therein.

In one embodiment, the ratio of the first base polymer to the second base polymer may be greater than 1 in weight percent, such that sufficiently cohesive constituents are present in the still warm state to prevent peeling due to restoring forces in the still warm state.

In one embodiment, the first and second layer may be pressed together in the laminating mold before, during and/or after reaching the first melting point of the base polymer so as to create the cohesive constituents of the first base polymer and to hold the layers together "temporarily".

A vehicle component capable of being manufactured using the described method is also contemplated. In particular, a vehicle interior component having a plurality of layers may be bonded together using a hot melt adhesive, as described above. It is also contemplated that the layer composition may be different. In one embodiment, the vehicle component includes at least two layers, a first layer being a dimensionally stable substrate and a second layer being a decorative layer, such as a sewn covering having a visible side, a haptic layer which is elastic in a normal direction, or a layered composite having a decorative layer and a haptic layer. However, it should be understood that the vehicle component may include more than three-layer structures. For other arrangements, reference is made to the description of the method to avoid repetitions.

A device for applying a hot melt adhesive, which may be used for the described method, is also contemplated.

In one embodiment, the device may be configured to detect the temperature of the hot melt adhesive at the outlet port. A controller may be provided to regulate the temperature at the outlet such that the hot melt adhesive is applied to the first layer at a temperature greater than or equal to the second melting point so as to ensure that the base polymer is activated when applied to the layer and creates a close bond after cooling, as explained above.

The device may include a second outlet port to provide a flow of hot air which may be parallel to, and preferably shroud, the flow of hot melt adhesive. The device may be configured to heat the hot air or adjust the temperature. In one embodiment, the controller may be configured to regulate the temperature of the air so that the desired hot melt adhesive temperature is reached at the outlet and the hot melt adhesive is applied to the first layer at the desired temperature.

It is also contemplated that additional parameters may be monitored and employed to regulate the temperature of the hot melt adhesive. For example, the room temperature may be detected and/or the distance between the outlet port of the hot melt adhesive and the surface of the first layer may be specified or detected and may influence the temperature setting of the hot melt adhesive at the outlet port.

Figure 2:
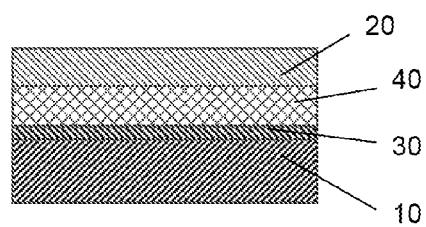
FIG. 2 is a schematic illustration of a three-layer structure of a vehicle component according to an embodiment of the present invention.
Figure 3:
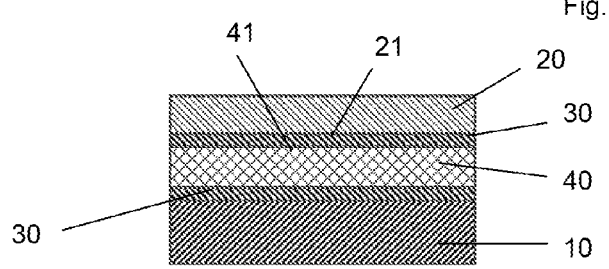
FIG. 3 is a schematic illustration of a three-layer structure of a vehicle component according to an embodiment of the present invention wherein two layers in each case are bonded with a hot melt adhesive.

FIGS. 1 to 3 illustrate various embodiments of a vehicle component that may be particularly suited for manufacture according to one or more aspects of the invention. As illustrated, a vehicle component may include a dimensionally stable substrate 10, such as an injection molded component, and a sewn decorative layer 20, such as a sewn covering, which are bonded together using a hot melt adhesive 30. In one embodiment, as illustrated in FIG. 2, a sewn covering 20 provided with a backing, such as a haptic layer 40 (e.g., formed of a textile), may be bonded to a substrate 10 using a layer of hot melt adhesive 30. In one embodiment, as illustrated in FIG. 3, a sewn decorative layer 20 may be bonded to a haptic layer 40, such as a spacer fabric, using a hot melt adhesive layer 30, and the haptic layer 40 may be bonded to a substrate 10 using an additional layer of hot melt adhesive 30.

In one embodiment, the method for manufacturing the vehicle component may involve first coating one of the layers 10, 20, 40 with a hot melt adhesive 30. For example, the substrate 10 (FIGS. 1 and 2) or the substrate 10 and the back side 21 (B-side) of the decorative layer or one side 41 of haptic layer 40 (FIG. 3) is coated with a hot melt adhesive 30. For some methods, the individual layers may initially be conditioned or pretreated, if desired, to improve the adhesion.

Figure 4:
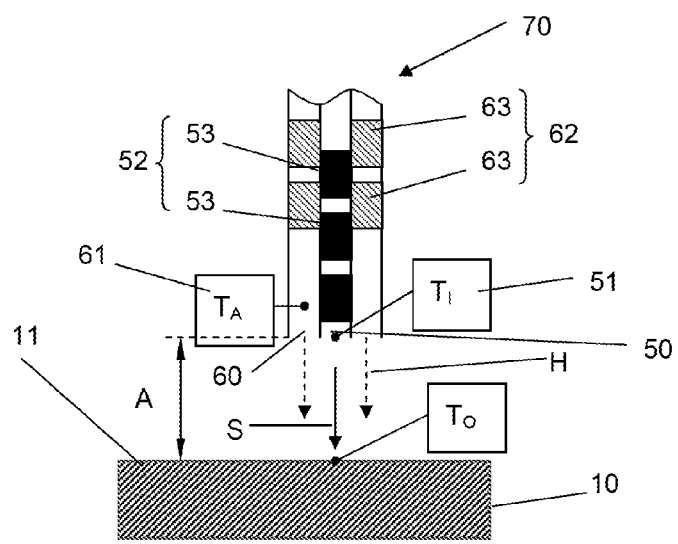
FIG. 4 is a schematic illustration of a device for applying a hot melt adhesive according to an embodiment of the present invention.

Application of the adhesive may be carried out, for example, using a device as illustrated in FIG. 4. In one embodiment, the hot melt adhesive may be applied to a substrate 10 in the manner of a curtain. In this regard, the substrate 10 may be moved past one or more outlet ports 50, 60 without movement of the application head 70. So that the hot melt adhesive is applied to the first layer, for example, the upper side 11 of the substrate 10, at a temperature $T_O$ above the second melting point, a temperature $T_1$ for the hot melt adhesive is detected using a sensor 51 at the outlet port 50, while a distance A is either measured from the outlet port to the substrate surface or is stored in the controller. If desired, the room temperature may also be detected with an additional temperature sensor (not illustrated).

As shown in FIG. 4, it may also be desirable to provide a hot air flow H from one or a plurality of outlet ports 60. The hot air flow may be directed to run parallel to the hot melt adhesive flow S. The hot air flow may be arranged to shroud the hot melt adhesive flow. The temperature $T_A$ of the hot air in the region of outlet port 60 may be detected by an air temperature sensor 61.

The device may include two heaters or heating devices 52, 62 located upstream of outlet ports 50, 60 to heat the hot melt adhesive and the air. The heaters may include a plurality of series-connected heating cartridges 53, 63 for this purpose. The controller may be configured to regulate the temperature of the hot melt adhesive to a desired value so as to maintain the temperature $T_O$ of the hot melt adhesive within a desired range when applied to the surface of substrate 10. The controller may also be configured to control or regulate, preferably continuously, the heating devices 62, 63 accounting for the measured values of the sensors 51, 61 and of the room temperature sensor and the distance A.

After applying the hot melt adhesive 30 to the joining layer or layers, customary methods may be used to prefix the layers in relation to each other, for example, the sewn decorative layer 20 on the substrate 10, as should be apparent to one of skill in the art.

The vehicle component may then be transferred to a customary laminating device. Fusing of the first base polymer of the hot melt adhesive at the phase boundary interface results from targeted input of energy into the adhesive joint. However, energy input occurs in this case in such a manner that the melting temperature or the melting point of the first base polymer is reached without reaching the melting temperature or melting point of the second base polymer. Moreover, the contact with the uncoated layer, for example, the sewn covering, is effected in this region using a compressive pressure (gap measurement, set pressure, high-pressure vacuum, etc.) as a result of which cohesive constituents already form in the first base polymer.

After the sequence of specified laminating parameters (pressure, time, temperature), the component is removed from the laminating device in a still warm/hot state and stored outside the laminating device. Reconditioning takes place outside the mold without any additional cooling process. In the process, the hot melt adhesive, in particular the constituents of the first base polymer, holds the layers together and prevents peeling or delamination while in the still warm state.

It is to be appreciated that advantages of a laminating process can be implemented using a hot melt adhesive, whereby the process can be considerably sped up due to the possibility of warm demolding and the omission of a cooling process which provides a significant cost benefit.

What is claimed is:

1. A method for manufacturing a vehicle interior component having a plurality of layers, the method comprising:
    applying a hot melt adhesive to a first side of a first layer, the hot melt adhesive including a first base polymer having a first melting point and a second base polymer having a second melting point that is greater than the first melting point, the hot melt adhesive being applied to the first side of the first layer at a temperature greater than or equal to the second melting point;
    following application of the hot melt adhesive, applying a second layer to the first side of the first layer;
    in a laminating mold, heating the hot melt adhesive between the first layer and the second layer to a specified temperature greater than or equal to the first melting point and less than the second melting point; and
    demolding the plurality of layers of the component from the laminating mold prior to complete cooling of the hot melt adhesive.

2. The method according to claim 1, wherein the plurality of layers of the component are demolded immediately after reaching the specified temperature greater than or equal to the first melting point and less than the second melting point.

3. The method according to claim 1, further comprising regulating the temperature of the hot melt adhesive leaving an outlet port of a device for applying the hot melt adhesive to the first layer to keep the temperature of the hot melt adhesive greater than or equal to the second melting point of the second base polymer when applied to the first layer.

4. The method according to claim 1, further comprising accompanying the hot melt adhesive with a hot air flow as the hot melt adhesive is applied to the first layer, the hot air flowing parallel to the hot melt adhesive in the direction of the first layer.

5. The method according to claim 4, wherein the temperature of the hot air flow is regulated to keep the temperature of the hot melt adhesive greater than or equal to the second melting point of the second base polymer when applied to the first layer.

6. The method according to claim 1, wherein the hot melt adhesive is applied to the first side of the first layer in a curtain manner.

7. The method according to claim 1, wherein the first melting point is from 35° C. to 55° C.

8. The method according to claim 1, wherein the first base polymer corresponds to a pressure-and heat-sensitive adhesive.

9. The method according to claim 1, wherein the second melting point is from 60° C. to 100° C., preferably 65° C. to 85° C.

10. The method according to claim 1, wherein the hot melt adhesive has a weight percentage ratio of the first base polymer to the second base polymer that is greater than one.

11. The method according to claim 1, wherein the first layer and the second layer are pressed together in the laminating mold before, during and/or after reaching the first melting point of the first base polymer.

\* \* \* \* \*

UNITED STATES PATENT AND TRADEMARK OFFICE
CERTIFICATE OF CORRECTION

| | | |
|---|---|---|
| PATENT NO. | : 8,864,928 B2 | Page 1 of 1 |
| APPLICATION NO. | : 13/659045 | |
| DATED | : October 21, 2014 | |
| INVENTOR(S) | : Ernst Thalhammer et al. | |

It is certified that error appears in the above-identified patent and that said Letters Patent is hereby corrected as shown below:

In the Specification:

On the title page, in item (30), replace "10 2011 085 412" with --10 2011 085 412.6--

Item (30) should read: Oct. 28, 2011    (DE) ..................... 10 2011 085 412.6

Signed and Sealed this
Tenth Day of February, 2015

Michelle K. Lee
*Deputy Director of the United States Patent and Trademark Office*